United States Patent
Yuknewicz et al.

(10) Patent No.: US 7,490,314 B2
(45) Date of Patent: Feb. 10, 2009

(54) SYSTEM AND METHOD FOR EXPOSING TASKS IN A DEVELOPMENT ENVIRONMENT

(75) Inventors: Paul Yuknewicz, Redmond, WA (US); Michael Harsh, Kirkland, WA (US); Simon Calvert, Issaquah, WA (US); Donna Wallace, Woodinville, WA (US); Antoine Cote, Redmond, WA (US); Fred Balsiger, Carnation, WA (US); Nikhil Kothari, Sammamish, WA (US); Brian Pepin, Seattle, WA (US); Jeffrey Chrisope, Kirkland, WA (US); Graeme Mott, Redmond, WA (US); Christopher Dias, Kirkland, WA (US); Bulusu Krishna Mohan, Redmond, WA (US); Andrew Cheng-min Lin, Seattle, WA (US); Joseph F. Kubiniec, Seattle, WA (US); James Schmelzer, Seattle, WA (US); Corrina Barber, Snohomish, WA (US); Anson M. Horton, Sammamish, WA (US); Meghan Rae Perez, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 10/768,522

(22) Filed: Jan. 30, 2004

(65) Prior Publication Data

US 2005/0171967 A1    Aug. 4, 2005

(51) Int. Cl.
G06F 9/44 (2006.01)
(52) U.S. Cl. .................... 717/105; 715/810
(58) Field of Classification Search ......... 717/100–113, 717/120; 715/810
See application file for complete search history.

(56) References Cited

U.S. PATENT DOCUMENTS

| 4,674,065 | A |   | 6/1987  | Lange et al. .......... 364/900 |
| 5,267,155 | A |   | 11/1993 | Buchanan et al. ..... 364/419.14 |
| 5,392,386 | A |   | 2/1995  | Chalas .................. 395/155 |
| 5,557,730 | A | * | 9/1996  | Frid-Nielsen ........... 715/839 |
| 5,736,974 | A | * | 4/1998  | Selker ................... 715/862 |
| 5,815,830 | A |   | 9/1998  | Anthony |
| 5,859,636 | A |   | 1/1999  | Pandit .................. 345/335 |
| 5,946,647 | A |   | 8/1999  | Miller et al. ............. 704/9 |

(Continued)

OTHER PUBLICATIONS

Abiteboul, S. et al., "A Logical View of Structured Files", *The VLDB Journal*, 1998, 7, 96-114.

(Continued)

*Primary Examiner*—Wei Y. Zhen
*Assistant Examiner*—Matthew J Brophy
(74) *Attorney, Agent, or Firm*—Woodcock Washburn LLP

(57) ABSTRACT

A user interface is provided that exposes items such as developer tasks, commands, property settings, and other related information to a user. The user interface may be invoked in a number of development interfaces such as, for example, a designer or an editor. The user interface may be either an object bound interface or an action triggered interface. An object bound interface exposes a set of items that are associated with a corresponding object. An action triggered interface exposes a set of items that are associated with a corresponding triggering action. In addition to enumerating developer tasks, the user interface may provide a direct link to other interfaces that facilitate task execution.

31 Claims, 13 Drawing Sheets

U.S. PATENT DOCUMENTS

| | | | | |
|---|---|---|---|---|
| 6,085,201 | A | 7/2000 | Tso | 707/505 |
| 6,122,647 | A | 9/2000 | Horowitz et al. | 707/513 |
| 6,182,279 | B1* | 1/2001 | Buxton | 717/100 |
| 6,305,008 | B1 | 10/2001 | Vaidyanathan et al. | 717/4 |
| 6,311,323 | B1 | 10/2001 | Shulman et al. | 717/111 |
| 6,367,068 | B1 | 4/2002 | Vaidyanathan et al. | 717/8 |
| 6,405,364 | B1* | 6/2002 | Bowman-Amuah | 717/101 |
| 6,502,233 | B1 | 12/2002 | Vaidyanathan et al. | 717/101 |
| 7,017,143 | B1* | 3/2006 | Andrew et al. | 717/100 |
| 7,055,136 | B2* | 5/2006 | Dzoba et al. | 717/125 |
| 7,139,999 | B2* | 11/2006 | Bowman-Amuah | 717/101 |
| 7,299,419 | B2* | 11/2007 | Evans | 715/763 |
| 2004/0221262 | A1* | 11/2004 | Hampapuram et al. | 717/113 |

OTHER PUBLICATIONS

Anderson, K.M. et al., "Chimera: Hypertext for Heterogeneous Software Environments", *ECHT Proceedings*, Sep. 1994, 94-107.

Breidenbach, G., "Programmable Keyboard Controller", *Electronic Praxis*, 2001, 6, 68-70 (English Language Abstract).

Hayes, P.J. et al., "A Logical View of Types", *Association for Computing Machinery*, 1980, 128-130.

Henninger, S. et al., "A Tool For Managing Software Development Knowledge", *PROFES*, 2001, LNCS 2188, 182-195.

Holmes, N., "Seven Great Blunders of the Computing World", *Computer*, 2002, 110-112.

Hughes, G. et al., "Microsoft Smart Tags: Support, ignore or condemn them?", *HT*, 2002, 80-81.

Jewell, D. "Windows Shell Secrets", *EXE*, 1999, 13(9), 35-45.

Kramer, B. "3D LISP Tools", *Cadence*, 1989, 4(5), 130-134.

Kucza, T. et al., "Improving Knowledge Management in Software Reuse Process", *PROFES*, 2001, LNCS 2188, 141-152.

Lewis, P.H. et al., "Media-based Navigation with Generic Links", *Hypertext*, 1996, 215-223.

Lin, C.F. et al., "Chinese Text Distinction and Font Identification by Recognizing most Frequently Used Characters", *Image and Vision Computing*, 2001, 19, 329-338.

Middel, C.D., "Software Configuration and Change Management", *Proceedings 5th Conference On Quality Engineering in Software Technology*, 2001, 239-245 (English Language Abstract).

Zagler, W.L., "Text Generation for Disabled Persons Using Word Prediction", *OEGAI-Journal*, 2001, 20(2), 21-22 (English Language Abstract).

IBM Research/Eclipse, http://www.research.ibm.com/eclipse, Home page ,2 pages.

JetBrains IntelliJ IDEA- the best Java IDE around, http://www.intellij.com, 1 page.

Slickedit;Code Editor, C++ Editor, Java Editor, HTML Editor, XML Editor, Unicode Editor, http://www.slickedit.com, 1 page.

Source Insight Program Editor and Analyzer, http://www.sourcedyn.com/index.html, 2 pages.

Borland, CodeWright The Programmer's Editing System, http://www.premia.com, 1 page.

Chalmers-Physical Resource Theory, "The Complex Adaptive Systems Programmer of year 2000", http://www.frt.fy.chalmers.se/kristian/software.html, 1 page.

Emacs/W3 v 4.0, http://www.cs.indiana.edu/elisp/w3/docs.html, 1 page.

Vi: A Unix text editor, http://www.indiana.edu/~ucspubs/b104/ztoc.html, 8 pages.

MacroMedia, Inc., Director MX, Using Director, Copyright © 2004, Macromedia, Inc., 496 pages.

Willisson, Pace, et al., ISPELL: UNIX Man Pages, Aug. 23, 2003, 73 pages.

SED(1), BSD Reference Manual, sedMan.txt, 6 pages.

McMahon, L.E., "SED-A Non-Interactive Text Editor", *Bell Laboratories*, Aug. 15, 1978, 10 pages.

The Complete Red Hat® Linux™ Operating System 5.2 Deluxe, Macmillan Digital Publishing, U.S.A., 385 pages.

CoStar User's Manual, "For AddressMate and AddressMate Plus", CoStar Corp., 1994-1995, pp. 1-1 thru Index-210.

Beitner, N.D. et al., "Multimedia Support and Authoring in Microcosm: An Extended Model", Department of Electronics and Computer Science, University of Southampton, 12 pages.

IBM Research Disclosure #368, "Multimedia Hyperlinks Automatically Created for Reference Documents", Jun. 1993, 5 pages.

Microsoft® Office 97 User's Manual, "Getting Results with Microsoft® Office 97—Real World Solutions for the Work You Do", 1997, 1-703.

Corel® Corporation Limited, Corel® InfoCentral User's Manual, 1996, vol. 1, Version 7.0, 1996, 1 thru 86.

Corel® Office Professional 7 Quick Results, 7-531.

Novell® GroupWise™ User's Guide for Windows 16-Bit, Version 5.2, 1993-1997, 1-231.

Novell® Group Wise™ User's Guide for Windows 32-Bit, 1998, Novell, Inc., 1-318.

Claris for Macintosh, Claris Emailer Getting Started, 1995-1997, Claris Corporation, 61 pages.

Developer's Guide to Apple Data Detectors—For Version 1.0.2, ©Apple Computer, Inc., 1997, 1-34.

Apple Data Detectors User's Manual, © 1997 Apple Computer, Inc., 1-16.

Nardi, B.A., et al., "Collaborative, Programmable Intelligent Agents", Mar. 1998, Apple Computer advanced Technology Group, 1-11.

U.S. Appl. No. 10/178,680, filed Jun. 24, 2002, Jeffrey Reynar.

U.S. Appl. No. 10/779,298, filed Feb. 13, 2004, Svetlana, L.

* cited by examiner

Editor 210b

This is exemplary text with an exemplary object for providing an

610a example for the editor

620

Editor 210b

This is exemplary text with
— 620 an exemplary object for providing an
 — 610b example for the editor

Editor 210b

This is exemplary text with
an exemplary object for providing an
example for the editor

SYSTEM AND METHOD FOR EXPOSING TASKS IN A DEVELOPMENT ENVIRONMENT

REFERENCE TO RELATED APPLICATIONS

This application is related by subject matter to U.S. patent application Ser. No. 10/769,637 entitled "System and Method for Providing a Logical View of a Data Source" filed on Jan. 30, 2004, U.S. patent application Ser. No. 10/768,525 entitled "System and Method for Generating a Parameterized Query" filed on Jan. 30, 2004, and U.S. patent application Ser. No. 10/768,526 entitled "System and Method for Exposing a Child List" filed on Jan. 30, 2004, the contents of which are hereby incorporated by reference in their entirety.

FIELD OF THE INVENTION

The present invention relates to the field of software development and, more specifically, to providing a user interface that enables a user to efficiently view and select developer tasks in a development environment.

BACKGROUND OF THE INVENTION

A development tool such as, for example, VISUAL STUDIO™ from Microsoft Corp. of Redmond, Wash., enables development of a wide range of computing applications. Such applications may include, for example, web applications, extensible markup language (XML) applications, and traditional client applications. As part of the development process, a user may view, manage, and manipulate a number of objects within the development environment. Such objects may include, for example, forms, controls, components, text strings, and other like elements associated with the development process. The development tool may employ a number of development interfaces that enable the user to interact with such objects.

One such development interface is the designer. Generally, the designer enables the user to add, align, position, view, manage, and manipulate forms and controls. A form is an object that enables the presentation of information to the user and the acceptance of input information from the user. A form may expose properties and methods which define its appearance and behavior, and events which define its interaction with the user. By setting its properties and writing code to respond to its events, a user may customize a form to meet the requirements of an application. A simple way to define a user interface for a form is to place controls on the form's surface.

A control is an object that is contained within a form. A control may be an object such as, for example, a data grid view, a drop down list, a combo-box, a button, or a check-box. Each type of control has its own set of properties, methods, and events that make it suitable for a particular purpose. The designer enables a user to add controls to a form. For example, the designer may enable a control to be added to a form by dragging and dropping the control from a server management console or a logical data source interface such as described in the aforementioned U.S. patent application Ser. No. 10/769,637 entitled "System and Method for Providing a Logical View of a Data Source". Once a control is added to a form, the designer enables the control to be aligned and positioned within the form.

Another development interface that the enables the user to interact with objects is the development tool code and text editor. Generally, the editor provides a word processing interface that enables a user to efficiently generate, edit, and save source code and text related to application development. The editor may include a language specific service that checks for syntax and usage errors within source code. The editor may be opened directly from a control by, for example, right clicking on the control and selecting a view code option. The source code or text within the editor may include a number of objects.

To better enable the user's interaction with such objects, it is desirable for the development tool to expose and execute an increasing number of developer tasks. The term developer task, as used herein, refers to any task executed in connection with an object or a triggering action performed by the user within a development interface. Such developer tasks may be, for example, data configuration and builder tasks performed in connection with an object. Such developer tasks may also be, for example, tasks which modify a user action with a user specified result. Some exemplary developer tasks are described in the aforementioned U.S. patent application Ser. No. 10,768,525 entitled "System and Method for Generating a Parameterized Query" and U.S. patent application Ser. No. 10/768,526 entitled "System and Method for Exposing a Child List".

Conventional development tools may employ a combination of user interfaces such as traditional menus, shortcut menus, status bars, and toolbars to expose tasks and commands to the user and alert the user to important information within an application. Traditional menus hold commands, grouped by a common theme. Toolbars use buttons to expose frequently used commands. Context menus "pop up" in response to a right-click of the mouse and hold commonly used commands for a particular area of an application. Often, context menus are assigned to controls, and provide particular commands that relate to the control to which they are assigned. Status bars indicate an application state or provide information about a corresponding entity in the application that has a focus, such as a menu command.

While the user interfaces set forth above serve many purposes, their implementation involves several drawbacks. For example, traditional menus, toolbars, and status bars are generally located around the perimeter of a development interface and, therefore, are not local to an object or screen area in which a triggering action occurs. Thus, to invoke such interfaces in connection with an object, the user is required to, for example, move a screen pointer from an object to the perimeter of a development interface, thereby interrupting the user's actions and thought process.

A context menu may alleviate some of the positioning drawbacks set forth above because the context menu may be displayed adjacent to an object. However, a drawback of the context menu is that its discoverability is limited. Specifically, before being displayed, it must first be requested by the user. Thus, the user may not be aware or may forget that the context menu is available. Additionally, the user must interrupt her action and thought process to request the context menu. Also, because the context menu does not persist with a corresponding object, the user must repeatedly request the context menu every time she wishes to use it. Another drawback of the context menu is that it is limited to text items and does not include, for example, user input fields such as radio buttons, check boxes, and drop down menus which may enable the user to input object properties. Furthermore, the context menu and traditional menus require the user to either select a menu option or close the menu before the user may return to the development interface in which she is working. Thus, even if the user does not wish to immediately invoke a menu item, the user's actions and thought process must be interrupted to close the menu.

Accordingly, there is a need in the art for a "smart" user interface for exposing items including developer tasks and commands, view and modify properties, and ascertain other related information in connection with a corresponding object or triggering action. The user interface may also expose items that are relevant to child objects that are associated with the corresponding object and tool defined tasks that are related to the corresponding object. It is desired that the user interface be functional in a number of development interfaces such as, for example, the designer and the editor. It is further desired that the user interface provide a "rich" display that includes, for example, user input fields such as text edit boxes, check boxes, radio buttons, and drop down menus. It is further desired that the user interface enable direct execution of developer tasks or, alternatively, provide a direct link to other interfaces that facilitate task execution. It is further desired that the user interface provide strong visual attractors in proximity to an object, thereby alerting the user to its availability. It is further desired the user interface expose tasks and information in a non-obtrusive manner without interrupting the actions or the thought process of the user. It is further desired that the user interface function in a manner that is consistent with other interfaces in other computing environments such as, for example, in personal productivity systems, thereby providing a familiar and intuitive experience for the user. It is further desired that the user interface optionally persist with a corresponding object as long as the object is present or the action is applicable in a development interface so that the user need not repeatedly request the user interface. It is further desired that the user interface enable the selection of customized tasks, commands, and information. Other features and advantages of the invention may become apparent from the following detailed description of the invention and accompanying drawings.

SUMMARY OF THE INVENTION

A user interface is provided that exposes items such as developer tasks, commands, property settings, and other related information to a user. The user interface may be implemented in and invoked from a number of development interfaces such as, for example, a designer or an editor. The user interface may be either an object bound interface or an action triggered interface. An object bound interface exposes items that are associated with a corresponding object and possibly other associated child objects in a development interface. An action triggered interface exposes items that are associated with a corresponding user action performed in a development interface.

According an aspect of the invention, a task provider monitors the development interface to detect objects and their corresponding states. The task provider determines, based on the state of the detected objects, which developer tasks are available in connection with detected objects. The task provider also detects user actions occurring within the development interface and determines which developer tasks are available in connection with the detected actions. A task service functions in connection with the task provider to manage developer tasks.

According to another aspect of the invention, the user interface may include a panel that is displayed adjacent to a corresponding object. The panel may be instantaneously displayed when a corresponding object is dropped into a development interface. The panel may also be requested using short cut key stroke mechanisms. Alternatively, an icon may first be displayed to indicate to the user, in a non-obtrusive manner, that a panel is available. The user may then request the panel by, for example, moving a screen pointer over the icon and clicking on the icon with an attached mouse. In addition to traditional text items, the panel may also include, for example, user input fields such as text edit boxes, check boxes, radio buttons, and drop down menus. Such user input fields may enable the user to set properties of a corresponding object. In addition to enumerating developer tasks, the panel may provide a direct link to other interfaces that facilitate task execution. A programmatic interface may enable the user to provide custom content that may be included in a panel.

According to another aspect of the invention, an icon may be either an object bound icon or an action triggered icon. An action bound icon may be displayed adjacent to a corresponding object. An action triggered icon may be displayed adjacent to an object on which a corresponding triggering action is performed. Thus, both an object bound icon and an action triggered icon may be displayed adjacent to a single object. Various informational symbols may be displayed on the face of an icon to indicate to the user whether the icon is an object bound icon or an action triggered icon and also, possibly, to indicate a particular type of triggering action with which the icon is associated. Characteristics of an icon such as, for example, its shape, size, shading, and informational symbols may vary depending on the user's interaction with the icon and the adjacent object. For example, the characteristics of an icon may vary depending on whether a screen pointer operated by the user is hovering away from an icon, hovering indirectly over an icon, or hovering indirectly over an icon.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step"

may be used herein to connote different aspects of methods employed, the term should not be interpreted as implying any particular order among or between various steps herein disclosed unless and except when the order of individual steps is explicitly described.

We will now explain the present invention with reference to presently preferred, exemplary embodiments. We will first describe illustrative computing and development environments in which the invention may be practiced, and then we will describe presently preferred implementations of the invention.

Illustrative Computer Environment

Figure 1:
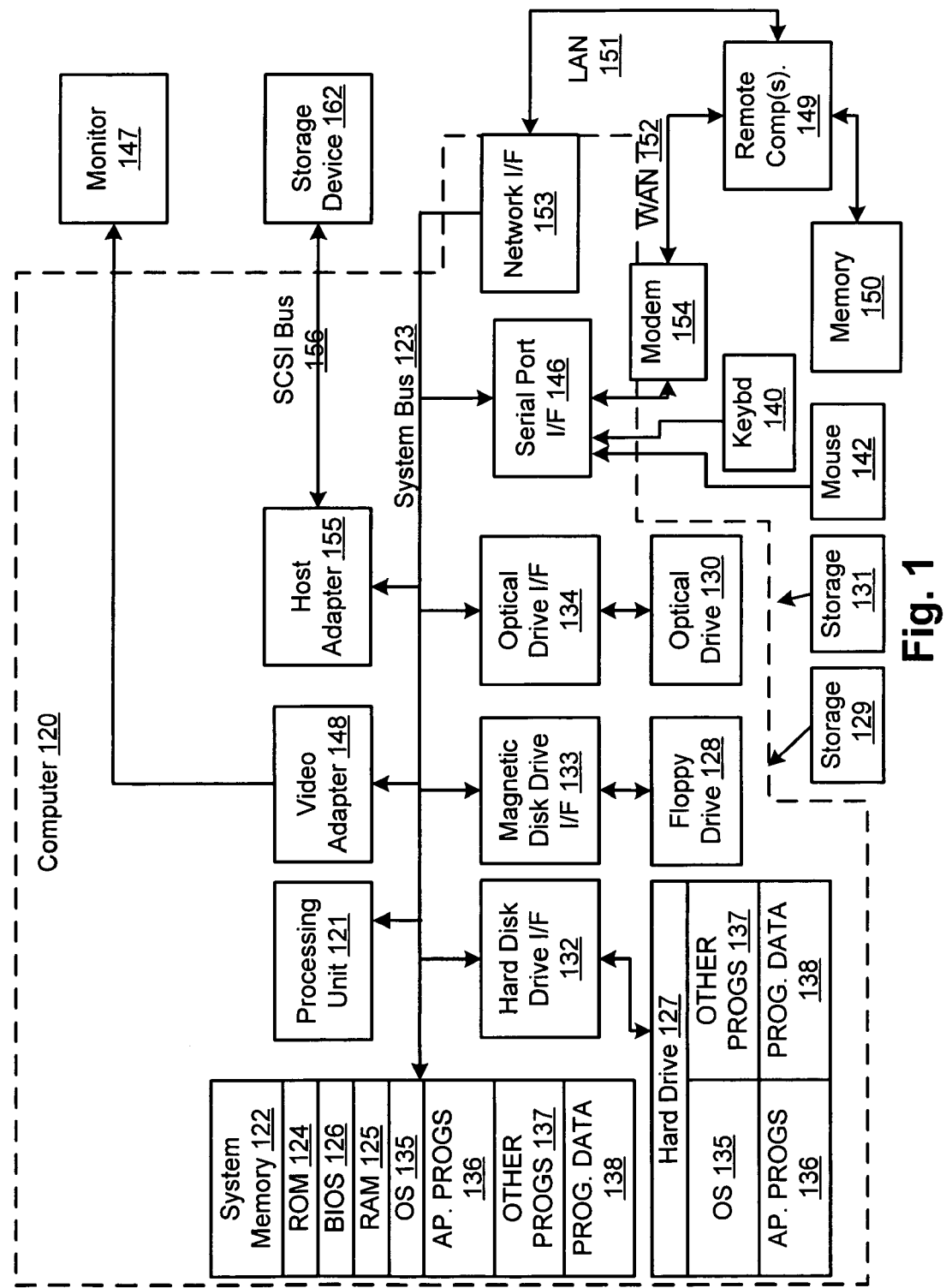
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or an application service. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a application service, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Systems and Methods of the Present Invention

Figure 2:
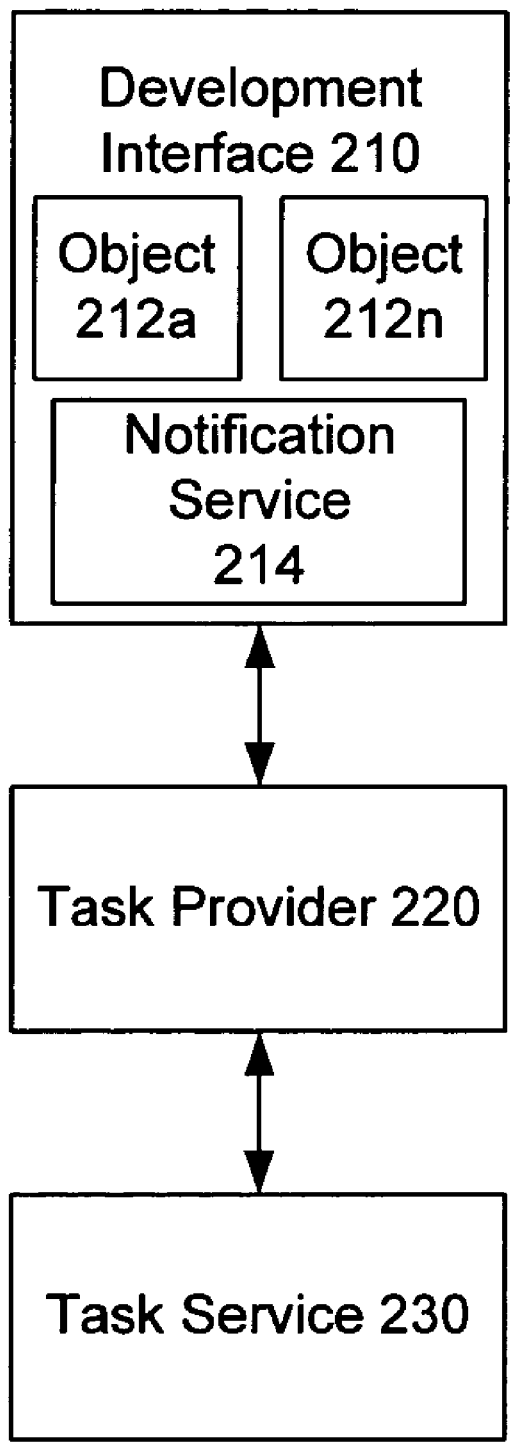
FIG. 2 is a block diagram of an exemplary development environment in accordance with the present invention.

An exemplary development environment 200 in accordance with the present invention is shown in FIG. 2. Development environment 200 includes a development interface 210. As should be appreciated, development environment 200 may include any number of development interfaces 210. Generally, development interface 210 enables the user to view, manage, and manipulate a number of objects 212a-n within development environment 200. Such objects 212a-n may include, for example, forms, controls, components, text strings, and other like elements associated with the development process. Development interface 210 also enables the user to perform a number of actions. Such actions may be, for example, adding and positioning objects 212a-n within development interface 210 and modifying the properties of objects 212a-n.

Development interface 210 may be, for example, a designer or an editor. As set forth above, a designer enables the user to add, align, position, view, and otherwise manage objects such as, for example, forms and controls. An editor provides a word processing interface that enables a user to generate, edit, and save source code and text related to application development. The source code or text within the editor may include a number of objects.

Development interface 210 includes a notification service 214 that tracks objects 212a-n and their corresponding states and other related information. For example, notification service 214 may track the data sources to which objects 212a-n are bound. Notification service 214 also tracks user actions occurring within development interface 210.

Task provider 220 communicates with notification service 214 to detect objects 212a-n within the development interface 210 and their corresponding states. The task provider 220 determines a set of developer tasks that are associated with each detected object 212. For example, data grid view control may have a set of associated data configuration and builder tasks. The availability of the associated tasks may vary based on the state of the detected object 212. For example, the availability of the data configuration and builder tasks may vary depending on the types of data sources to which the data grid view control is bound.

The task provider 220 also communicates with notification service 214 to detect actions occurring within the development interface 210 and determines a set of developer tasks associated with a detected action. Such developer tasks generally modify an action with a user specified result. For example, when a control is dragged from a toolbox and dropped into a form in the designer, the control may be automatically docked in a parent control. An associated developer task may, for example, enable the user to undock the control from its parent.

A task may not always be available in connection with an object or triggering action. The determination of which, if any, tasks are available in connection in connection with an object or triggering action may require some time, and, therefore, task provider 220 has the ability to delay or delegate the identification of developer tasks until the application is idle, thereby not slowing the responsiveness of development interface 210.

To determine the available tasks that are associated with an object or triggering action, task provider 220 may query task service 230. Task service 230 effectively maintains an association between an object and a corresponding set of available tasks that are associated with the object. The task service also 230 provides a programmatic interface that enables a user to add and remove tasks from an objects corresponding set of available tasks. The programmatic interface may be invoked after receiving notifications from notification service 214. Task service 230 also maintains logic for exposing tasks to the user.

The developer tasks set forth above may be exposed in a user interface in accordance with the present invention. In addition to exposing developer tasks, the user interface may expose other related items such as, for example, commands, properties, and information in connection with objects 212a-n and actions performed by a user within development interface 210. The user interface may be either an object bound interface or an action triggered interface.

An object bound interface is associated with a corresponding object 212 in development interface 210. The object bound interface exposes a set of items associated with the corresponding object 212. The object bound interface may also expose tasks that are related to child objects that are associated with the corresponding object. As set forth above with respect to developer tasks, the availability of items may vary depending on the state of the object 212. The object bound interface preferably persists with the corresponding object 212 as long as the object 212 is present in development interface 210. Thus, the object bound interface enables the execution of developer tasks in iterative scenarios which may include executing several tasks in an arbitrary order. The object bound interface also enables the performance of tasks in a "re-entrant" fashion. The term "re-entrant", as used herein, refers to performing a task successively without deleting the intermediate states. Thus, the task may be re-entered with the initial state being initialized using the previous state.

An action triggered interface is triggered by a corresponding user action performed in development interface 210. The action triggered interface exposes a set of items associated with the corresponding action. The action triggered interface preferably expires after the occurrence of an expiration event. Such an expiration event may be, for example, the expiration of a time interval after the performance of the triggering action. An expiration event may also be, for example, the performance of another user action after the performance of the triggering action.

The items exposed in the user interface may be displayed to the user in a user interface panel. Such a panel is described in detail below with reference to FIGS. 4a and 4b. Development interface 210 may enable a user to select an "auto-pop" option, in which the panel is displayed instantaneously when a corresponding object 212 is added to development interface 210. The panel may also be requested using short cut key stroke mechanisms.

Alternatively, prior to displaying the panel, a user interface icon may be displayed to the user. Such an icon indicates, in a non-obtrusive manner, that a panel is available. Unlike a prior art context menu, an icon preferably does not require a response form the user. An icon may be an object bound icon or an action triggered icon, depending on whether it is displayed in connection with an object bound or an action triggered interface, respectively. An object bound icon may be displayed adjacent to a corresponding object. An action may be displayed adjacent to an object on which a corresponding triggering action is performed. Thus, both an object bound and an action triggered icon may be displayed adjacent to a single object.

Characteristics of an icon such as, for example, its size, shape, form, shading, color, and position relative to an object may vary. Such characteristics may be dependent on factors such as, for example, the particular development interface 210 in which the icon is displayed, whether the icon is an object bound icon or an action triggered icon, and user preferences. Development interface 210 may enable the user to set particular icon characteristics.

Additionally, various informational symbols may be displayed on the face of an icon to indicate to the user whether the icon is an object bound icon or an action triggered icon. For example, an object bound icon may include a drop down arrow, while an action triggered icon may include both a drop down arrow and an informational symbol such as, for example, a quotation mark. In some cases, the particular informational symbol displayed on an action triggered icon may indicate with which type of action the icon is associated. For example, an icon showing two overlaying, lined pages may be used to indicate a copy text action.

Figure 3A:
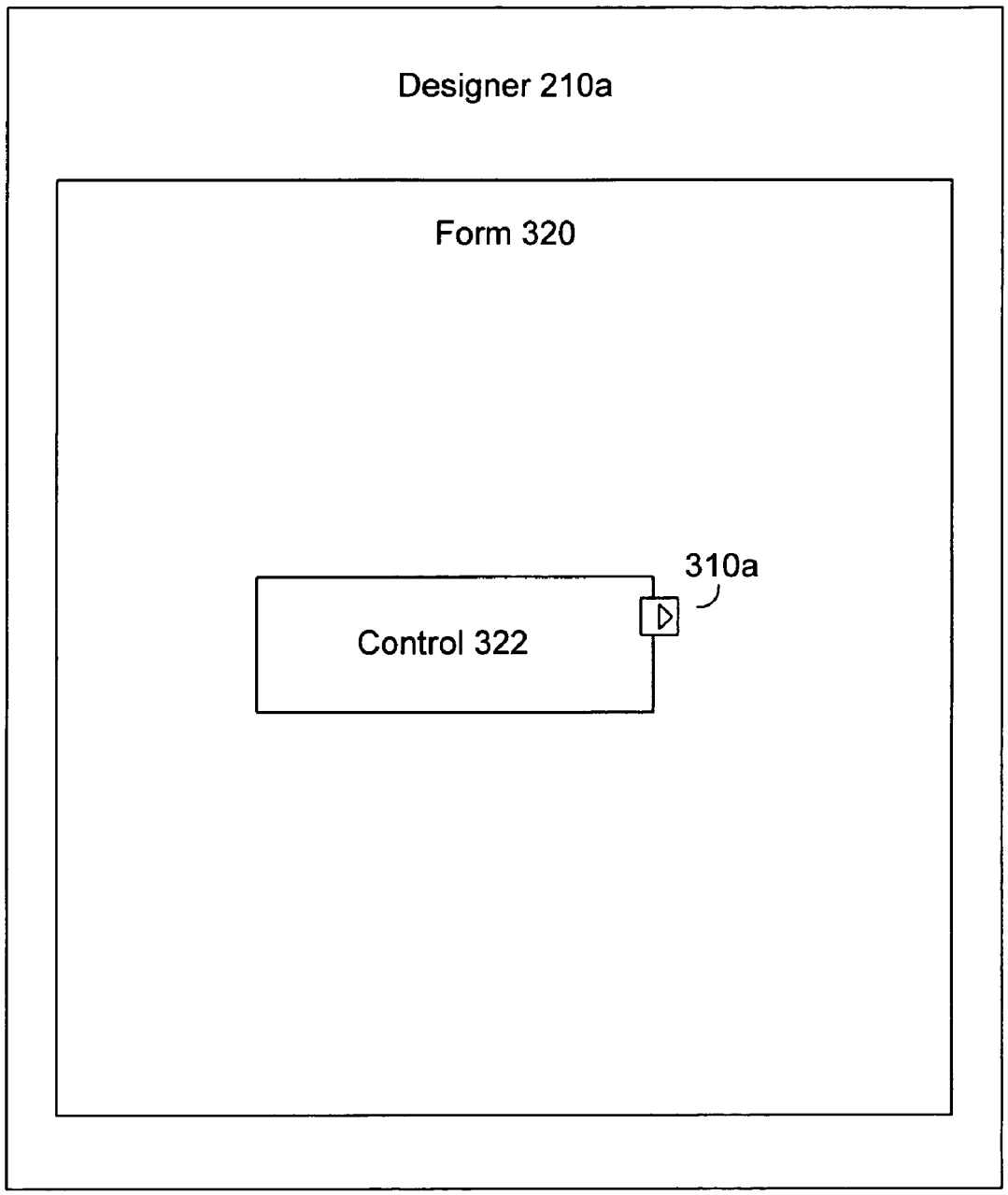
FIG. 3a-3c show exemplary user interface icons within the designer interface in accordance with the present invention.
Figure 3B:
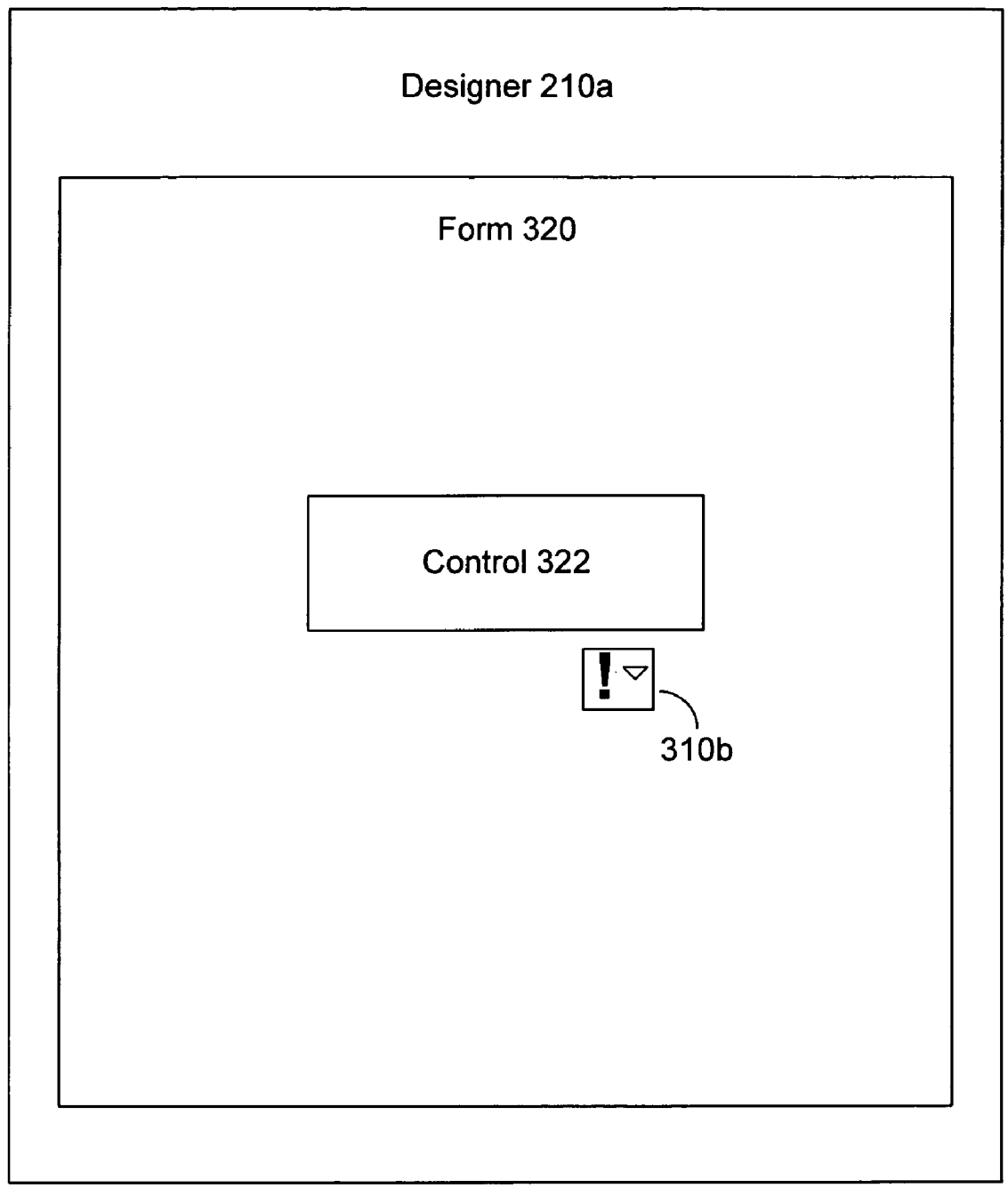
Figure 3C:
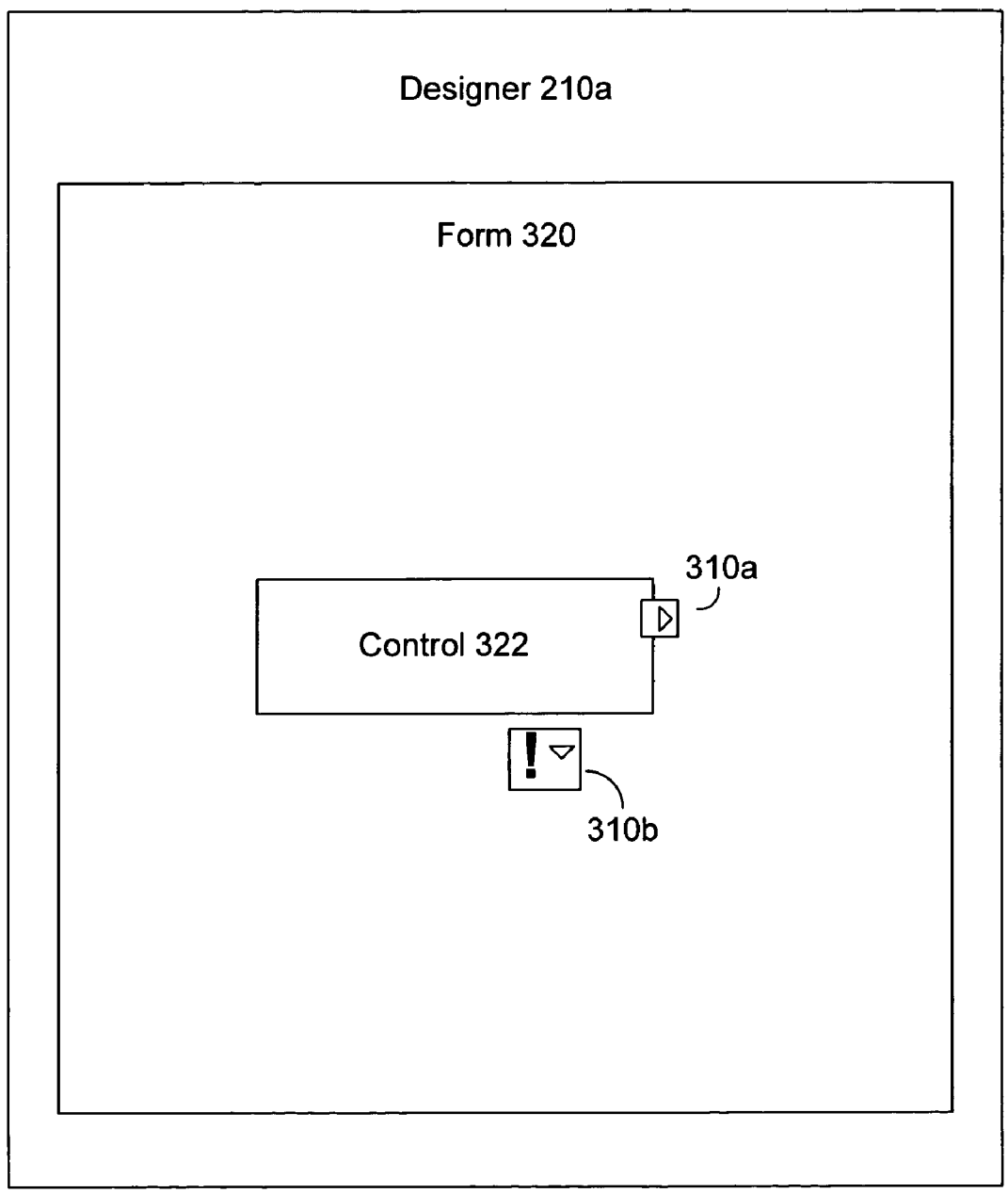

Exemplary icons in the designer interface are shown in FIG. 3a-c. As should be appreciated, similar icons may be employed in the editor interface with optional variations as will be described in detail below with reference to FIG. 6a-6c. An exemplary object bound icon is shown in FIG. 3a. Object bound icon 310a is associated with control 322. Control 322 is positioned in a form 320 within designer 210a. Object bound icon 310a indicates to the user that an object bound panel is available in connection with control 322. Object bound icon 310a includes only a drop down arrow. Referring now to FIG. 3b, control 322 has an associated action triggered icon 310b, which indicates to the user that an action triggered interface panel is available in connection with an action that has been performed on control 322. Unlike object bound icon 310a of FIG. 3a, which includes only a drop down arrow, action triggered icon 310b includes both a drop down arrow and a exclamation mark symbol. The addition of the exclamation mark symbol indicates to the user that the icon 310b is an action triggered icon rather than an object bound icon. Referring now to FIG. 3c, control 322 has both an associated object bound icon 310a and an associated action triggered icon 310b, which indicate that both an object bound panel and an action triggered panel are available.

Characteristics of an icon may also vary based on the user's interaction with the icon and/or object to which it corresponds. For example, characteristics of the icon may vary depending on whether control 322 is selected or whether it is one in a group of selected objects. Furthermore, the characteristics of the icon may vary depending on a location of screen pointer with respect to the icon. Exemplary icons displayed in response to various user interactions are described in detail below with reference to FIGS. 6a-6c.

If a group of objects are multi-selected, then only the primary selected object may display any icons that are present. Non-primary objects in a multi-selection may, however, show their corresponding icons when a screen pointer hovers over them. Otherwise, non-primary objects may function as if they are not selected. Additionally, if a number of objects overlap one another, then only the primary object may display any icons that are present. Furthermore, if an object is positioned on a screen such that it has a corresponding object icon and action triggered icon that overlap one another, then the action triggered icon may be displayed on top of the object icon. A floating tool window displayed in the designer interface may partially cover an icon. However, clicking on the icon may generate a display of the panel over the tool window.

An icon may be shown continuously during a scroll operation. If a scroll operation requires an icon to be moved so that it may be visible to the user, then the moving icon may be visible as the screen is scrolled. When an object is resized or moved, its corresponding icon may disappear during the operation and may reappear when the operation is completed. If an object is first positioned so that its corresponding icon is not shown and the object is then subsequently resized or moved such that the icon may be shown, then the icon may be displayed after the operation is completed.

Once an icon is displayed, a user may request a user interface panel by, for example, moving a screen pointer over the icon and clicking the icon with an attached mouse. The user may also be requested is by placing a screen pointer over the icon for a sufficient duration of time. The panel may also be requested using short cut key stroke mechanisms.

The panel may than be displayed adjacent to a corresponding icon. The panel may include traditional text items from which the user may select. Such text items may be developer tasks and other commands grouped and ordered using extensibility mechanisms made available by development interface 210. Text items may also be displayed on the panel to provide, for example, textual information, a textual header, or a label. In addition to text items, the panel may include user input fields such as, for example, text edit boxes, check boxes, radio buttons, and drop down menus. Such user input fields may enable the user, for example, to set properties of a corresponding object. The panel may also include custom content selected by a user via a programmatic interface. The properties may also be associated with type converters for an additional rich user interface. For example, such association with type converters may be used with respect to a color picker.

Figure 4A:
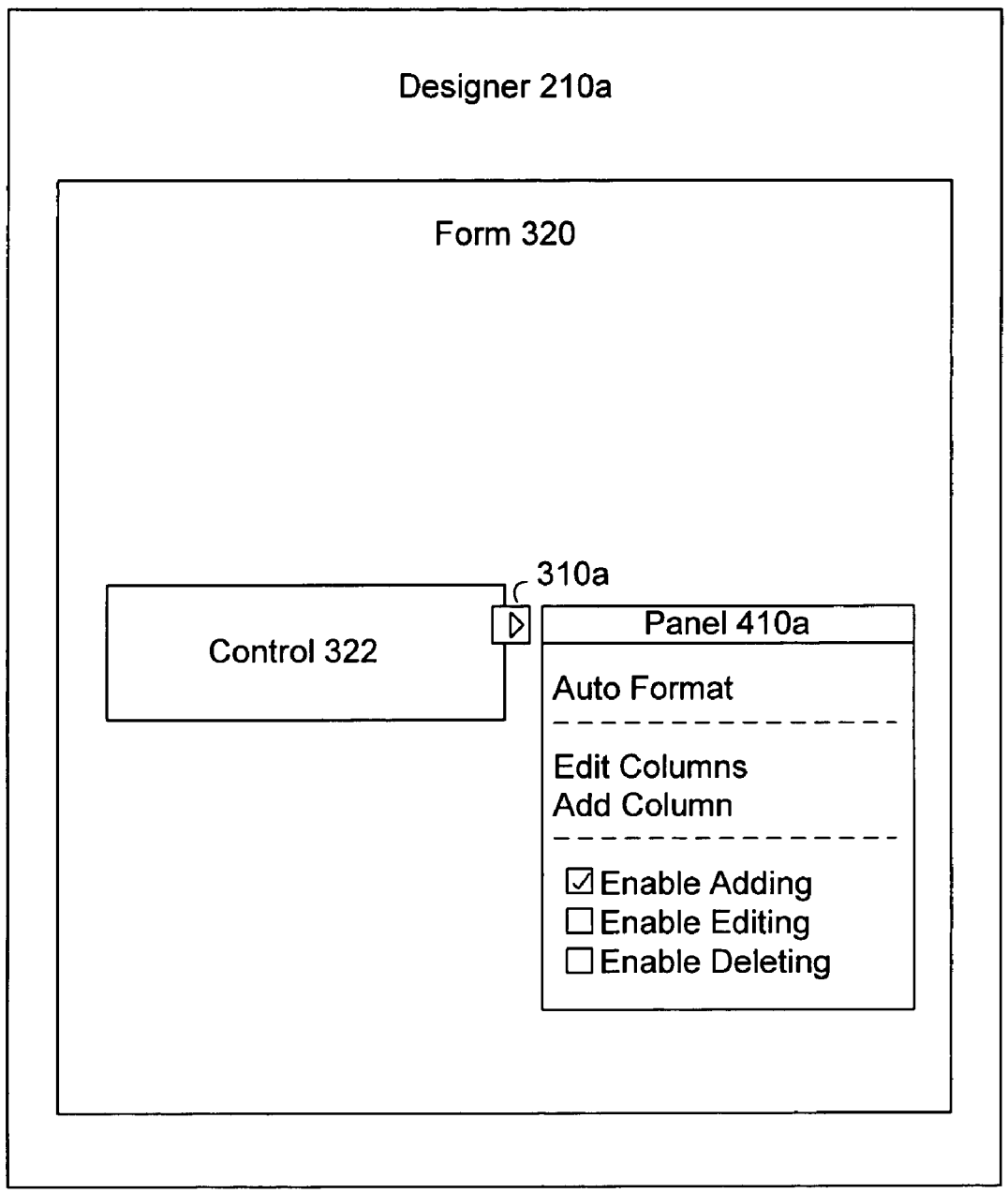
FIGS. 4a and 4b show exemplary user interface panels in the designer interface in accordance with the present invention.
Figure 4B:
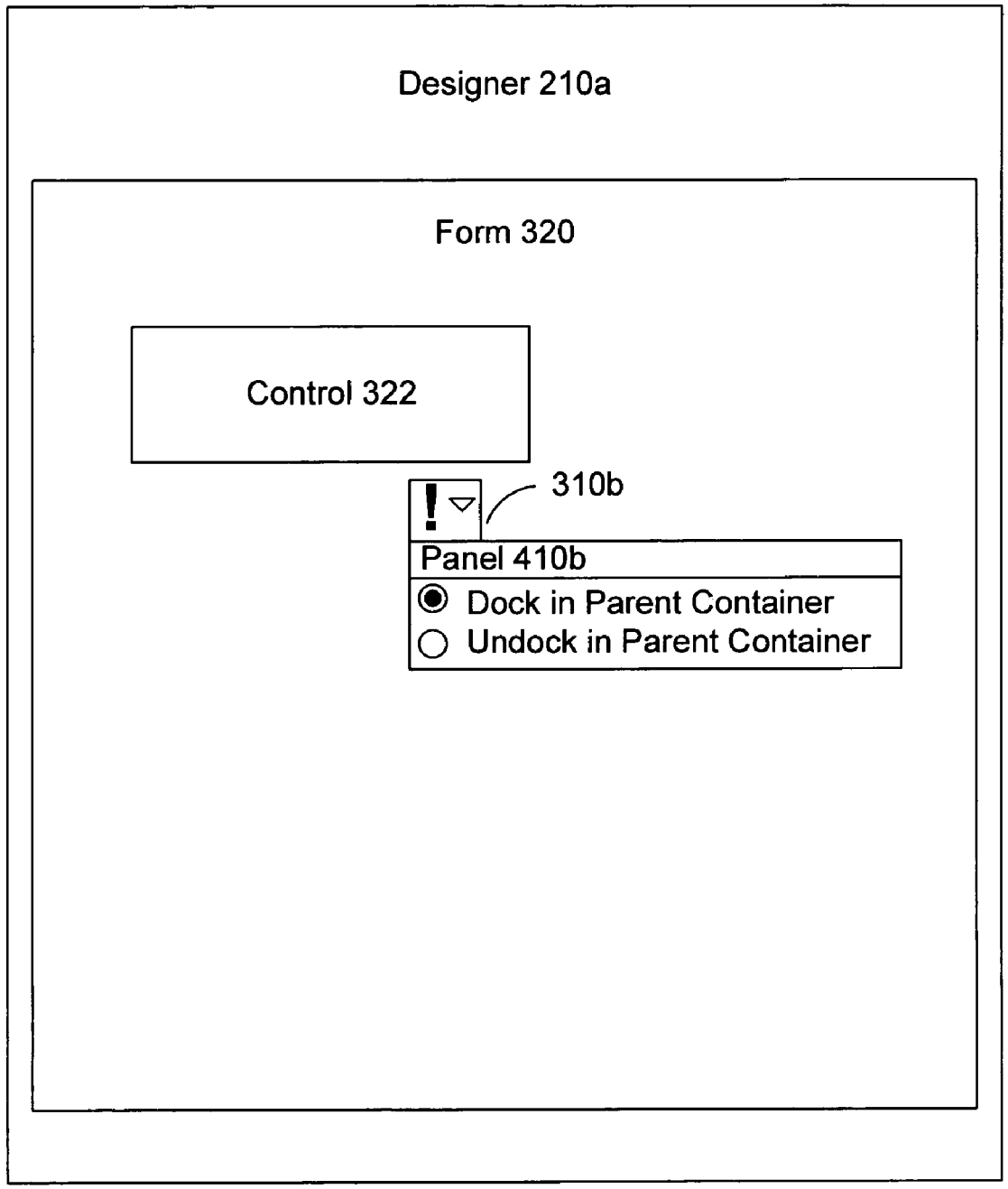

Exemplary panels in the designer interface are shown in FIGS. 4a and 4b. As should be appreciated, similar panels may be employed in the editor interface with optional variations as will be described in detail below with reference to FIG. 7. An exemplary object bound panel 410a is shown in FIG. 4a. Object bound panel 410a is displayed adjacent to object bound icon 310a. Object bound panel 410a includes a list of exemplary developer tasks available in connection with control 322. Such tasks include auto format, column edit, and column addition. The edit column and add column tasks are grouped according to their likely common use. Object bound panel 410a also includes three user input fields displayed below the developer tasks. As should be appreciated, although user input fields 420 are check boxes, other user input fields such as, for example, text edit boxes, radio buttons and drop down menus may be displayed. User input fields 420 correspond to exemplary properties of control 322. The exemplary properties are enable adding, enable editing, and enable deleting. As shown, the enable adding property is selected. The enable editing and enable deleting properties are not selected.

An exemplary action triggered panel 410b is shown in FIG. 4b. Action triggered panel 410b is displayed adjacent to action triggered icon 410b. Action triggered panel 410b includes a list of exemplary developer tasks available in connection with the triggering action performed on control 322. Such exemplary tasks include dock in parent container and undock in parent container. The dock in parent container task is selected.

The default positioning of a panel may be to the bottom right of an object as shown in FIGS. 4a and 4b. However, the positioning of a panel may vary when there is not sufficient room to display the panel in its default positioning due to the positioning of the object. For example, when an object is positioned at the bottom edge of a screen, the panel may be positioned to the top right of the object rather than to the bottom right of the object. When an object is positioned at the right edge of a screen, the panel may be positioned to the top of the object and as far right as possible without exceeding the screen boundary. The panel may partially cover the object. When an object is positioned at the top right corner of a screen, the panel may also be positioned at the top right corner of the screen and may partially or entirely cover the object.

The positioning of the panel with respect to the icon may also vary. For example, the default positioning is for the panel to be aligned with a corner of the icon as shown in FIGS. 4a and 4b. However, if the object is positioned such that there is not sufficient room to align the panel with a corner of the icon and display the entire panel, then the panel may slide against the icon until the panel may be entirely displayed.

Figure 5A:
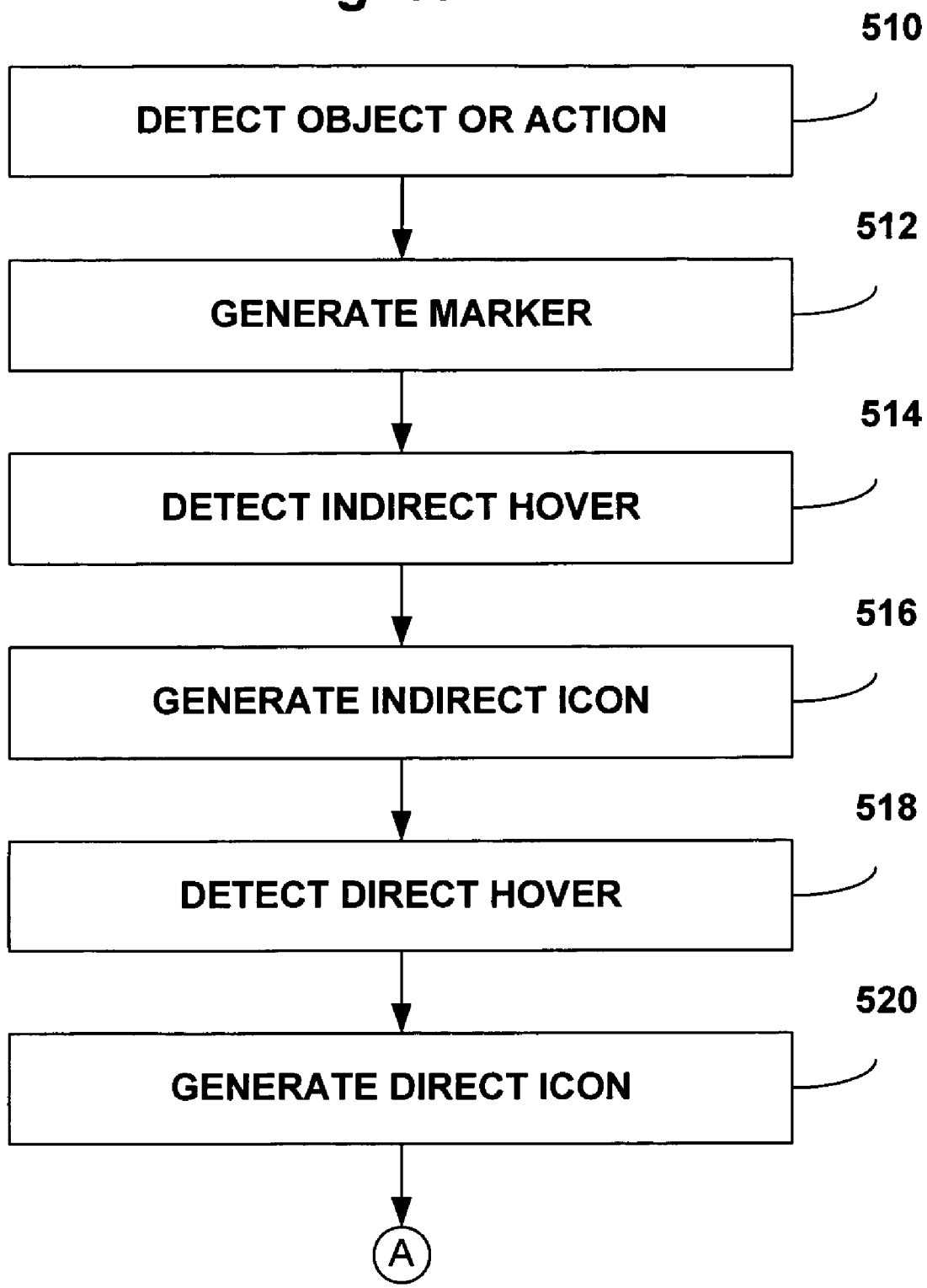
FIGS. 5a and 5b are a flowchart of an exemplary method for exposing developer tasks in accordance with the present invention.
Figure 5B:
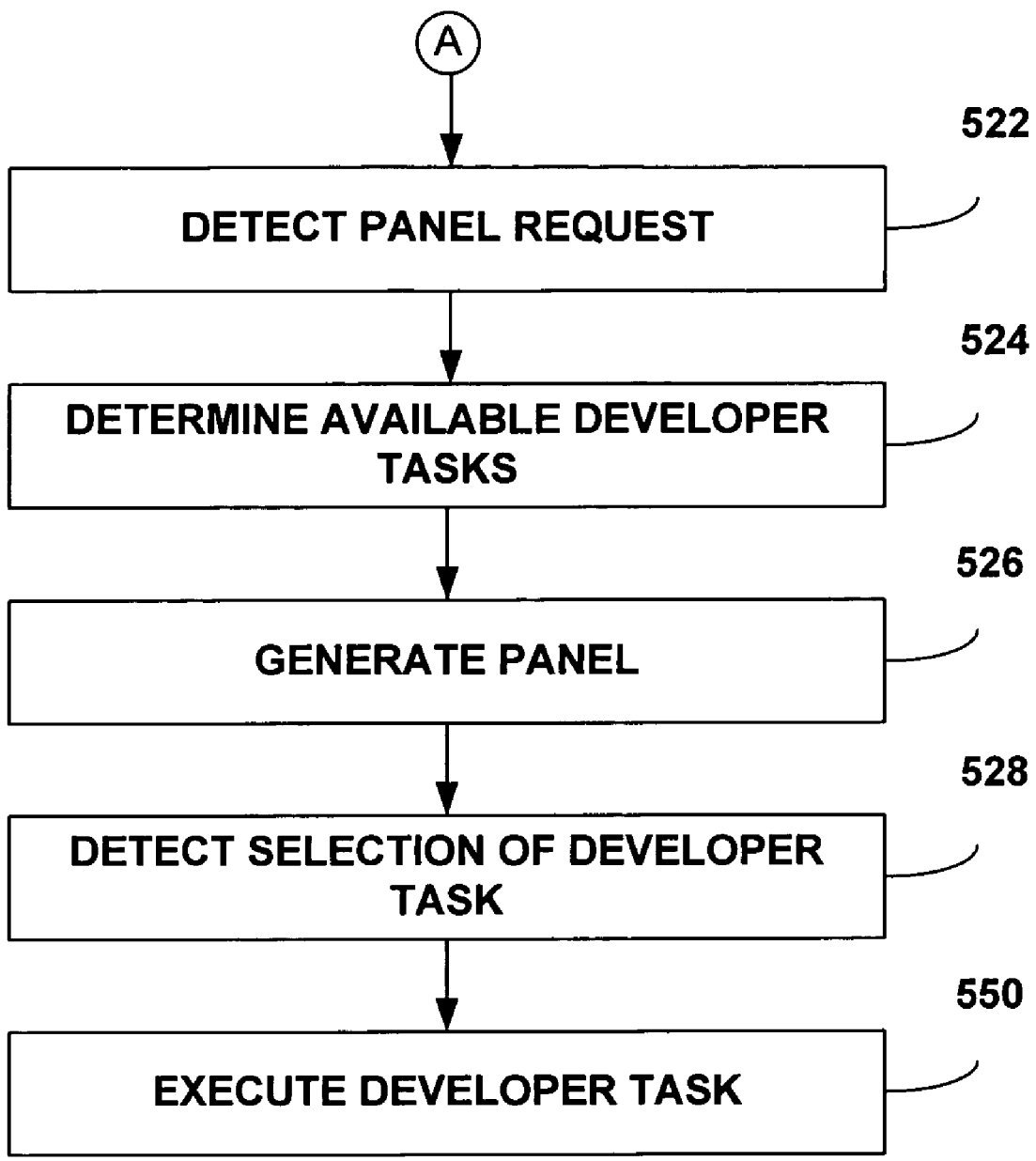

An exemplary method for exposing developer tasks in accordance with the present invention is shown in FIGS. 5a and 5b. At step 510, task provider 220 detects an object 212 or a triggering action within development interface 210. At step 512, task provider 220 generates a "marker" icon. The marker is a small non obtrusive icon which notifies the user that a task interface is available in connection with the detected object 212 or triggering action. As should be appreciated, in certain instances, no developer tasks may be available for the object or triggering action. Thus, prior to generating the marker at step 512, task provider 220 may first determine whether a developer task is available for the detected object 212 or triggering action. If no such developer task is available, then task provider 220 may fail to generate the marker.

Step 512 is an optional step. For example, in one embodiment of the present invention, the marker may only be displayed when a screen pointer is hovering over the same line as a corresponding object. The relationship between the object and task provider 220 is maintained even if the marker is not displayed.

Figure 6A:
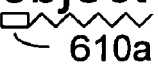
FIG. 6a-6c show exemplary user interface icons within the editor interface in accordance with the present invention.
Figure 6A:

An exemplary marker in the editor interface 210b is shown in FIG. 6a. Editor interface 210b includes exemplary text with an exemplary object shown by the word "object". The word "object" is underlined with a squiggly line to indicate to the user that it is an object. Although the squiggly line is shown in FIG. 6a, the squiggly line need not be displayed every time a smart tag is available in connection with an object. The editor 210b includes a screen pointer 620, which may be guided by a user input device such as an attached mouse. In FIG. 6a, pointer 620 is not positioned over the object or its corresponding icon 610a. Accordingly, icon 610a is merely a small, non-obtrusive marker that is a small rectangular box. The positioning of marker 610a may optionally vary depending on whether it is an object bound icon or an action triggered icon. For example, if marker 610a is an object bound icon, then it may be positioned to the bottom left of the object, as shown in FIG. 6a. If marker 610a is an action triggered icon, then it may be positioned to the bottom right of the object. In an alternative embodiment, the user may set marker 610a to be an enlarged icon that includes an informational symbol similar to the icon described below with reference to FIG. 6b.

Figure 6B:

At step 514, task provider 220 detects that screen pointer 620 is indirectly hovering over marker 610a, meaning that screen pointer 620 is hovering adjacent to the corresponding object. In response to the detection of the indirect hover, task provider 220 generates an indirect icon at step 516. An exemplary indirect icon 610b in editor interface 210b is shown in FIG. 6b. Indirect icon 610b is larger than marker 610a and includes an informational symbol. Screen pointer 620 is hovering adjacent to the word "object" while not hovering over icon 610b.

Figure 6C:

At step 518, task provider 220 detects that screen pointer 620 is directly hovering over icon 610b. In response to the detection of the direct hover, task provider 220 generates a direct icon at step 520. An exemplary direct icon 610c in editor interface 210b is shown in FIG. 6c. Direct icon 610c is enlarged to include a drop down arrow in addition to an informational symbol. As set for the above, different informational symbols may be displayed in direct icon 610c to indicate various types of triggering actions and tasks with which the icon is associated such as, for example, error correction, refactoring, and general tasks. Additionally, although not shown in FIG. 6c, direct icon 610c is preferably shaded.

At step 522, task provider 220 detects a request for a user interface panel. The user may request the panel by, for example, clicking on direct icon 610c with an attached mouse. At step 524, task provider 220 determines a set of developer tasks available in connection with the object or triggering action detected at step 510. As set forth previously, to determine the available tasks that are associated with an object or triggering action, task provider 220 may query task service 230. Task service 230 effectively maintains an association between an object and a corresponding set of available tasks that are associated with the object. The task service also 230 provides a programmatic interface that enables a user to add and remove tasks from an objects corresponding set of available tasks. The developer tasks available in connection with a detected object may vary depending on the state of the object.

Figure 7:
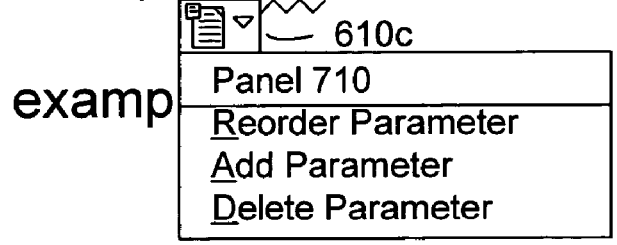
FIG. 7 shows an exemplary user interface panel in the editor interface in accordance with the present invention.

At step 526, task provider 220 generates a panel for the detected object or triggering action. An exemplary user interface panel in editor interface 210b is shown in FIG. 7. Panel 710 includes exemplary developer tasks reorder parameter, add parameter, and delete parameter. If desired and appropriate, panel 710 may also include expandable and collapsible sections for particular groups of items. Panel 710 may also include a list of help topics that provide contextual assistance to the user. Panel 710 may also include an item that enables the user to set options for the user interface. Panel 710 may also include a task that enables the user to change existing code or generate new code.

At step 528, task provider 220 detects a selection of a developer task from panel 710. The user may select a developer task, by for example, moving screen pointer 620 over the task and clicking the task with an attached mouse. As should be appreciated the user may dismiss the task interface without selecting a task. The user may dismiss the task interface 710 by, for example, moving screen pointer 620 to a screen area of development interface 210 that is not occupied by task interface 610 and clicking an attached mouse.

At step 530, the selected task is executed. The selected developer task may be executed directly from panel 710. Alternatively, the selection of the developer task may launch another user interface that facilitates execution of the task.

As should be appreciated, the method of FIG. 5 set forth above is described with respect to editor interface 210b. However, the method may be employed in designer interface 210a with optional variations such as, for example, changing the characteristics of the icon in response to a selection of a corresponding control. As should be appreciated, steps 512 to 522 of FIG. 5 are optional steps which may be performed or skipped individually or in combination. For example, as discussed previously, a user preference that may be invoked is an "auto-pop" feature, in which a panel is generated instantaneously when a control is added to a development interface. When the auto-pop feature is invoked for a detected object, steps 512 to 522 are not performed and the method skips from step 510 directly to step 524. Furthermore, the icons and panels described with respect to the method of FIG. 5 may also be displayed in designer interface 210a with optional variations as described in detail above with respect to FIGS. 3a-3c and 4a-4b, respectively.

Conclusion

Thus, a user interface for exposing developer tasks in connection with a corresponding object or triggering action has been disclosed. The user interface may also expose items that are relevant to child objects that are associated with the corresponding object and tool defined tasks that are related to the corresponding object. In addition to exposing developer tasks, the user interface may expose other commands, properties, and related information. The user interface functions in a number of development interfaces such as, for example, the designer and the editor. The user interface provides a rich panel that includes, for example, user input fields such as check boxes, radio buttons, and drop down menus. The user interface enables direct execution of developer tasks or, alternatively, provides a direct link to other interfaces that facilitate execution. The user interface is highly discoverable in that it provides a strong visual attractor in proximity to an object, thereby alerting the user to the availability of the interface. The user interface exposes tasks and information in a non-obtrusive manner without interrupting the actions or the thought process of the user. The user interface functions in a manner that is consistent with other interfaces in other computing environments such as, for example, in personal productivity systems, thereby providing a familiar and intuitive experience for the user. The user interface may optionally persist with a corresponding object as long as the object is present in a development interface. The user interface may expose customized tasks, commands, and information selected by a user.

While the present invention has been described in connection with the preferred embodiments of the various figures, it is to be understood that other similar embodiments may be used or modifications and additions may be made to the described embodiment for performing the same function of the present invention without deviating therefrom. For example, the user interface may be invoked in a development interface other than a designer or an editor. Therefore, the present invention should not be limited to any single embodiment, but rather should be construed in breadth and scope in accordance with the appended claims.

What is claimed:

1. A method for exposing a developer task that is associated with an object in a development interface, the method comprising:
   detecting an object in a development interface;
   determining that a developer task is associated with the object;
   displaying a first icon in the development interface and adjacent to the object to indicate that a panel is available that enables the developer task to be viewed and selected, the first icon being displayed without first requiring the object to be selected;
   in response to the screen pointer hovering over the object, displaying a third icon in the development interface and adjacent to the object, the third icon being larger than the second icon and including the informational symbol and an additional symbol;
   detecting a selection of the third icon: and
   displaying the panel in response to detecting the selection of the third icon.

2. The method of claim 1, further comprising detecting the object in a designer.

3. The method of claim 1, further comprising detecting the object in an editor.

4. The method of claim 1, further comprising: determining a state of the object; and determining that the developer task is associated with the object based on the state of the object.

5. The method of claim 1, wherein determining that the developer task is associated with the object comprises querying a task to service to determine that the developer task is associated with the object.

6. The method of claim 1, further comprising providing a programmatic interface that enables a user to associate the developer task with the object.

7. The method of claim 1, further comprising: displaying a second the icon adjacent to the object when a screen pointer is hovering over a screen area adjacent to the object; and displaying a third icon adjacent to the object when the screen pointer is hovering over the object.

8. The method of claim 1, further comprising displaying the panel adjacent to the first icon.

9. The method of claim 1, further comprising displaying a marker icon when a screen pointer is hovering over a screen area that is not adjacent to the object.

10. The method of claim 1, further comprising displaying a non-shaded icon when a screen pointer is hovering adjacent to the object.

11. The method of claim 1, further comprising displaying a shaded icon when a screen pointer is hovering over the first icon.

12. The method of claim 1, further comprising determining that the developer task is associated with a child object that is associated with the object that is detected in the development interface.

13. The method of claim 1, further comprising providing a user interface with a user input field that enables the user to set a property of the object.

14. The method of claim 1, further comprising: detecting a selection of the developer task; and providing a direct link to another user interface that facilitates the execution of the developer task.

15. The method of claim 1, further comprising executing the developer task in a re-entrant fashion.

16. A computer readable storage medium having computer-executable instructions that, when executed, cause a computer to perform the steps of:
   detecting an object in a development interface;
   determining that a developer task is associated with the object; displaying a first icon in the development interface and adjacent to the object to indicate that a panel is available that enables the developer task to be viewed and selected, the first icon being displayed without first requiring the object to be selected; in response to a screen pointer hovering over a screen area adjacent to the object, displaying a second icon in the development interface and adjacent to the object, the second icon being larger than the first icon and including an informational symbol; in response to the screen pointer hovering over the object, displaying a third icon in the development interface and adjacent to the object, the third icon being larger than the second icon and including the informational symbol and an additional symbol; detecting a selection of the third icon:
   and displaying the panel in response to detecting the selection of the third icon.

17. a method for exposing a developer task that is associated with an object in a development interface, the method comprising:
   detecting the performance of an action on an object in a development interface;
   determining that a developer task is associated with the action;
   displaying a first icon in the development interface and adjacent to the object to indicate that a panel is available that enables the developer task to be viewed and selected, the first icon being displayed without first requiring the object to be selected;
   in response to a screen pointer hovering over a screen area adjacent to the object, displaying a second icon in the development interface and adjacent to the object, the second icon being larger than the first icon and including an informational symbol;
   in response to the screen pointer hovering over the object, displaying a third icon in the development interface and adjacent to the object, the third icon being larger than the second icon and including the informational symbol and an additional symbol; detecting a selection of the third icon: and displaying the panel in response to detecting the selection of the third icon.

18. The method of claim 17, further comprising detecting the performance of the action in a designer.

19. The method of claim 17, further comprising detecting the performance of the action in an editor.

20. The method of claim 17, wherein determining that the developer task is associated with the action comprises querying a task to service to determine that the developer task is associated with the action.

21. The method of claim 17, further comprising providing a programmatic interface that enables a user to associate the developer task with the action.

22. The method of claim 17, further comprising: displaying a second icon adjacent to the object on which the action is performed when a screen pointer is hovering over a screen area adjacent to the object; and displaying a third icon adjacent to the object when the screen pointer is hovering over the object.

23. The method of claim 17, further comprising displaying the panel adjacent to the first icon.

24. The method of claim 17, further comprising displaying a marker icon when a screen pointer is hovering over a screen area that is not adjacent to the object on which the action is performed.

25. The method of claim 17, further comprising displaying a non-shaded icon when a screen pointer is hovering adjacent to the object on which the action is performed.

26. The method of claim 17, further comprising displaying a shaded icon when a screen pointer is hovering over the first icon.

27. The method of claim 17, further comprising causing the first icon to expire after a selected time interval.

28. The method of claim 17, further comprising causing the first icon to expire that expires after a performance of another action by a user.

29. The method of claim 17, further comprising displaying with the first icon that include an informational symbol corresponding to a type of action.

30. The method of claim 17, further comprising: detecting a selection of the developer task; and providing a direct link to another user interface that facilitates the execution of the developer task.

31. A computer readable medium storage having computer-executable instructions that, when executed, cause a computer to perform the steps of:
   detecting the performance of an action on an object in a development interface;
   determining that a developer task is associated with the action; displaying a first icon in the development interface and adjacent to the object to indicate that a panel is available that enables the developer task to be viewed and selected, the first icon being displayed without first requiring the object to be selected;
   in response to a screen pointer hovering over a screen area adjacent to the object, displaying a second icon in the development interface and adjacent to the object, the second icon being larger than the first icon and including an informational symbol;
   in response to the screen pointer hovering over the object, displaying a third icon in the development interface and adjacent to the object, the third icon being larger than the second icon and including the informational symbol and an additional symbol detecting a selection of the third icon: and displaying the panel in response to detecting the selection of the third icon.

* * * * *